United States Patent [19]

Ōdaira

[11] Patent Number: 4,501,604
[45] Date of Patent: Feb. 26, 1985

[54] METHOD OF PREPARING ARTIFICIAL FERTILE SOIL

[75] Inventor: Keikichi Ōdaira, Tokyo, Japan

[73] Assignee: Yojigen Agricultural Corporation, Tokyo, Japan

[21] Appl. No.: 466,552

[22] Filed: Feb. 15, 1983

[30] Foreign Application Priority Data

Feb. 26, 1982 [JP] Japan ................................. 57-28947

[51] Int. Cl.³ ........................... C05F 1/00; C05F 3/00; C05F 11/08
[52] U.S. Cl. ............................................. 71/15; 71/8; 71/21; 71/22; 71/23; 71/901
[58] Field of Search ..................... 119/1; 71/9, 13, 21, 71/24, 64.13, 901, 22, 23; 426/2, 55, 807; 435/243

[56] References Cited

U.S. PATENT DOCUMENTS

| 2,750,269 | 6/1956 | Klein | 71/21 |
|---|---|---|---|
| 3,716,371 | 2/1973 | Calvert et al. | 71/21 X |
| 4,023,954 | 5/1977 | de Maudave | 71/15 |
| 4,040,810 | 8/1977 | Eby et al. | 71/15 X |
| 4,108,625 | 8/1978 | Okada | 71/21 X |
| 4,262,633 | 4/1981 | Taboga | 119/1 |

FOREIGN PATENT DOCUMENTS

| 107974 | 9/1978 | Japan | 435/243 |
|---|---|---|---|
| 7602810 | 9/1977 | Netherlands | 119/1 |

Primary Examiner—Donald R. Valentine
Attorney, Agent, or Firm—Frishauf, Holtz, Goodman & Woodward

[57] ABSTRACT

The present invention is a method of preparing artificial fertile soil from pulverized material such as sawdust or wood chips by the utilization of biological mass production techniques. In the steps for converting the pulverized woody material into fertile soil, four-footed livestock such as cattle are raised thereon, followed by the addition thereto of crushed animal carcass residues, the breeding of earthworms therein and, finally, the raising of domestic fowl such as chickens thereon.

29 Claims, No Drawings

METHOD OF PREPARING ARTIFICIAL FERTILE SOIL

BACKGROUND OF THE INVENTION

The present invention relates to a method of preparing artificial fertile soil, which causes no root decay in plants, by utilizing biomass.

Natural fertile soil distributed over the surface strata of the earth is a natural substrate for culturing plants. This soil is well-suited for culturing plants without the addition of any aritificial fertilizers, as it will not adversely affect the physical development of plant roots (i.e., cause root poisoning) and it will maintain its fertilizing effect over a long period of time. Such fertile soil distributed in nature has been formed by a natural process mixing the organic residues of animals, plants and molds accumulated over countless generations together with weathered inorganic residues such as rock. Obviously, an extraordinarily vast number of years are required for the accumulation of such fertile soil. For example, an accumulation of only about a 1 cm layer of this natural fertile soil may take a period of 1,000 years.

Human beings are said to currently consume this valuable fertile soil to a thickness of 1 cm in only 5 years. This is a major factor in the recent appearance of deserts throughout the world. The term "deserts" used herein means regions of soil in which plants are no longer capable of growing, even if inorganic fertilizers are provided.

Fertile soil which closely resembles this natural rich soil may be produced by mixing farmyard manure with natural inorganic soil. Fallen leaves and straw which are raw materials in farmyard manure are obtainable only in season, and it is difficult to collect these materials over the whole year. In particular, the use of straw as a raw material has the disadvantage that it must also be used as feed for livestock. Farmyard manure may vary in quality, and production conditions may vary with both production location and batch, so that it is difficult to supply a large quantity of manure of uniform quality.

SUMMARY OF THE INVENTION

The present invention has for its object to provide a method of producing artificial fertile soil in a short period of time, such soil having a high fertilizing effect and being comparable to natural fertile soil in that it causes no adverse effects on the physical development of plant roots (i.e., it will not cause root poisoning).

Another object of the present invention is to provide a method capable of rationalizing animal husbandry by the utilization of biomass and biological mass production techniques in the preparation of artifical fertile soil, leading to improved productivity in the agricultural and livestock industries.

The present invention provides a method of preparing artificial fertile soil which comprises a step of preparing a first intermediate material which involves raising four-footed livestock such as cattle, horses or swine using a pulverized woody material as litter under massed or dense conditions such that a moisture content in the woody material reaches a level ranging from 60 to 90%, and preferably approximately 70%, by means of the livestock excrement, and then collecting such woody material; a step of preparing a second intermediate material which involves mixing the first intermediate material with crushed animal carcass material in an amount of 5 to 20% and then subjecting the resulting mixture to natural fermentation at high temperatures to substantial completion thereof; a step of preparing a third intermediate material which involves adding to the second intermediate material a large number of earthworms, for example, totalling from 1,000 to 3,000 times the number of four-footed livestock raised, breeding the earthworms for more than 9 months, for example, over their first to third generations, and collecting the resulting material containing the multiplied earthworms; a step of preparing a fourth intermediate material, if required, which involves mixing the third intermediate material with poultry excrement such as chicken, Japanese bantam or turkey excrement; and, if required, a step of preparing a final product which involves subjecting the fourth intermediate material having a moisture content of approximately 40 to 60%, and preferably about 50%, to natural fermentation to yield a material having a moisture content of approximately 20 to 40%, and preferably approximately 30%, and collecting such a material as the final product.

The step of preparing the fourth intermediate material may more preferably involve raising a large number of domestic fowl, for example, totalling about 4 to 6 times the number of four-footed livestock raised, using the third intermediate material as litter under massed or dense conditions for a given period of time, for example, until the young fowl have grown to adult size, and collecting the resulting litter as the fourth intermediate material.

The pulverized woody material to be employed in the present invention as a raw material may include sawdust and material obtained by grinding sawn lumber, thinned-out forestry trees or old wood with a crusher. These pulverized woody materials may generall contain terpenes, as well as insecticidal and fungicidal volatile substances, so that the use of these materials contributes to the health care of the livestock such as cattle, and at the same time has a beneficial effect in deodorizing a barn.

In accordance with the present invention, the animal carcass material to be mixed in the preparation of the second intermediate material may be in the form of crushed animal carcasses of land animals such as cattle, horses or swine; of marine animals such as sea hogs, whales or fish; or of refuse from such animals. The animal carcass material may be mixed in an amount of from 5 to 20% by weight, and preferably from 5 to 10% by weight, with respect to the weight of the first intermediate material.

A breeding period for earthworms which are to be introduced into the preparation of the third intermediate material in accordance with the present invention may vary according to the initial number of earthworms; it may be a period in the range generally required for breeding from one to three generations of earthworms, or, more generally, from one to two generations thereof, or may simply be in excess of 9 months since the time for breeding a first generation of earthworms usually ranges from 9 to 12 months. The resulting third intermediate material can assist in sustaining feed levels without the addition of any other feed when raising fowl in the following step.

The fertile soil produced according to the present invention may be used as a medium without admixture with any other material.

DETAILED DESCRIPTION OF THE PREFERRED EMBODIMENTS

The following is a detailed description of the present invention by way of experimental examples.

A cattle shed having a floor area of about 400 m² was covered with sawdust to an average depth of 10 cm on its concrete floor, and a hundred cattle were raised in the cattle shed. It should be noted that the depth of the litter may be thicker if it does not impede the movement of the cattle. Also, the cattle density per unit floor area should be high so that the cattle are raised under massed or dense conditions. This example illustrates each animal accounting for about 4 m². In instances where the lighting and hygiene conditions of a cattle shed are well controlled, it is rather advantageous that the cattle are raised under such conditions rather than under conventionally-applied loose conditions, since greater fattening of beef cattle occurs. In raising the cattle under massed or dense conditions, the cattle move around continously in the small area during the day time, thus treading on the litter (such as sawdust) together with their own excrement and mixing the two into a homogeneous substance. In this case, somewhat larger pieces of material such as pieces of wood may also be softened and broken into smaller pieces, and the substance as a whole may be rendered homogeneous by constant treading.

When the pulverized woody material used as the litter was uniformly mixed with excrement and urine, and the moisture content of the litter had reached nearly 70%, the litter was removed and fresh litter was provided on the floor of the cattle shed. Although the number of days required to reach this condition may vary with cattle body size and with amounts of litter used, this example indicates that the period required was 15 days and that the moisture content of the litter removed was 72%. An excessively high moisture content (much higher than 70%) should be avoided since this may decrease the temperature of fermentation in the following step. Volatile substances contained in the woody material disappeared during this step so that they did not have any adverse effect on the following step of fermentation. The mixed substance which was removed from the barn will be called a first intermediate material herein. This example yielded about 40 tons.

The first intermediate material was then mixed with about 2 tons of ground fish waste including bones, and the mixture was placed in a concrete chamber having a depth of about 1 m and a volume of 60 m³. The mixture was then subjected to natural fermentation.

The excrement and urine mixed in the first intermediate material contained an extraordinarily large number of fungi so that a fermentation temperature of 60° to 70° C. was generated during storage in the fermentation chamber for about 1 month, followed by a gradual decrease in the temperature. The inner temperature decreased to about 30° C. after about 2 months, and at this time the decomposition of the fish waste by fermentation was nearly completed to produce the second intermediate material. In this way, the second intermediate material should preferably be collected when the high temperature fermentation of the first intermediate material is close to completion, and the temperature is reduced to nearly room temperature.

A total of about 20,000 earthworms, were added to the second intermediate material and were bred therein for 16 months. As stated, number of earthworms added may vary from 1,000 to 3,000 times the number of cattle raised. As one generation of earthworms requires from 9 to 12 months to breed, this example indicates that the breeding period herein corresponded to nearly one and a half generations. During this breeding period, the earthworms will eat nearly two thirds of the second intermediate material and will increase to about one million in number. Some of the increased number of earthworms are stored as seed earthworms for later use. During this step, the second intermediate material was subjected to natural fermentation at temperatures ranging from 20° to 30° C., continuing the decomposition of the material, and about 12 tons of excrement from the earthworms was homogeneously admixed with the rest of the material at the end of the breeding period, thereby yielding the third intermediate material. Due to various kinds of microorganisms that live within the intestines of the earthworms, the excrement from the earthworms formed aggregations, thus providing the effect of allowing air to penetrate through the soil. Furthermore, tannins and alkaloids contained in the sawdust were completely decomposed so that the resulting material had remarkable fertilizing properties. Accordingly, the third intermediate material may be used intact as artificial fertile soil. In the example shown, the obtained third intermediate material contained about 50% moisture, and the yield was about 24 tons.

The third intermediate material was then spread as litter over the floor of a henhouse having a floor area of about 100 m² to an average thickness of about 30 cm, and about 500 chickens were raised therein until they were fully grown. The number of chickens raised may be from 4 to 6 times the number of cattle raised. The period required for raising the chickens to a body weight of 1 kg is about 4 months. Since the chickens grow by eating the earthworms contained in the third intermediate material, together with decomposed residues of the material and insects and other small living organisms living in the material, the addition of other feeds was not required. In instances where the third intermediate material is used as litter and where the moisture content of the material is below about 50%, it is necessary to replenish water, for example, by spraying the material in advance. The chickens foraged for feed by scratching deeply in the material, thus leading to a good admixture of the material with the chicken droppings and accelerating the fermentation of the material while raising the inner temperature from 25° to 35° C. This step provided the fourth intermediate material as the chickens matured.

The fourth intermediate material was then subjected to natural fermentation while it was heaped to a height of 1 m. As the fourth intermediate material was mixed homogeneously with fowl droppings, the fermentation temperature reached as high as 60° to 70° C., so that moisture was lost by evaporation during the natural fermentation. When the moisture content of the material reached about 30%, the material was withdrawn and was then subjected to pulverization. This pulverization was required to pulverize undecomposed animal bone residues contained in the first intermediate material. Nearly all the material ingredients other than the bone residues passed through a filter having a 1,000 micron mesh. Retaining a moisture content of about 30% in the material is necessary to ensure the activity of microorganisms in the final product.

The analysis of the resulting product having a moisture content of 32.5% showed the following results:

| | |
|---|---|
| Total carbon | 54.22% |
| Total nitrogen | 2.71% |
| (ammonia nitrogen, 424.6 mg %; nitrate nitrogen 0.77 mg %) | |
| Phosphoric acid | 2.43% |
| Potassium | 2.13% |
| Calcium | 12.49% |
| Magnesia | 7.85% |
| Insoluble ash | 18.17% |
| PH | 7.5 |

The following describes experimental examples illustrating the performance of the material in plant cultivation.

EXPERIMENTAL EXAMPLE 1

A total of 5 green pepper seedlings having a uniform height after 20 days from germination were transplanted into individual pots. Each of the five pots was filled with a seedling bed consisting of 1 kg of sterile river sand mixed uniformly with a fertilizer which will be described below. Water was then sprayed uniformly. The fertilizers filled in each of the pots were as follows:

| | |
|---|---|
| Pot #1: | Commerically available chemical fertilizer, 200 g (manufactured by Mitsubishi Kasei Kogyo K.K.; formulation of equivalent amounts of household chemicals, nitrogen, phosphoric acid and potassium dry materials) |
| Pot #2: | Commerically available organic fertilizer, 300 g (sold by K.K. Tosho; oil cake, 65%; bone powder, 25%, rice bran, 25%; fish meal, 5%; and ferment fungi; moisture content, 30%) |
| Pot #3: | Commerically available dried fowl droppings, 200 g (sold by Zenkoku Nogyo Kyodokumiai Rengokai, Japan) |
| Pot #4: | Natural fertile soil, 350 g (Obtained from topsoil of Shiroyama District, Horinouchi-machi, Niigata Prefecture, Japan where mountain lilies grow naturally) |
| Pot #5: | Product of the present invention, 300 g (moisture content, 30%) |

The seedlings transplanted into Pots #1 and #2 were dead after 15 days, whereas the seedlings transplanted into Pots #3 to #5, inclusive, continued to grow. The seedling in Pot #3 grew on a little bit thereafter but was completely dead after 30 days. The seedling transplanted into Pot #4 grew to nearly twice its height at the time of transplantation, while the seedling grown in Pot #5 grew to nearly three times its height at the time of transplantation.

As shown from the results of this experimental example, it was found that conventional artificial and organic fertilizers, when applied in the amounts as described above, adversely affect root growth, and ultimately cause the death of the plant. However, the product obtained by the method of the present invention provides the same results in maintaining the acceleration of plant growth as natural fertile soil, and, in fact, surpasses natural soil in its capability to accelerate plant growth.

In the experimental examples, the product produced by the method according to the present invention was treated as a fertilizer in the same manner as the other fertilizers; however, it is apparent from the following that the product of the present invention is not merely a fertilizer. It is generally well known that conventional artificial fertilizers, when applied in heavy concentrations, cause crops to grow rather weakly and adversely affect root growth (that is, they cause root poisoning). Further, those fertilizers similar to natural fertile soil, such as farmyard manure, will cause crop seeds to rot without germination when sown directly on the manure itself. The material obtained by the method according to the present invention, however, can be used intact as a growing medium without the mixture of natural soil, causing no adverse effects on root growth, permits normal germination even when seeds are sown directly thereon, and allows crops to grow dense and strong. These characteristics of the material according to the present invention cannot be seen in conventional fertilizers.

Although the causes of such characteristics are as yet unclear, possible causes include the fact that the material according to the present invention contains less than 20% insoluble ash, as is shown in the preceeding table, while a culturing earth contains more than 50% insoluble ash when conventional fertilizers are applied in a maximum amount which will not adversely affect root growth, and also that the total carbon content is very high. A high total carbon content means that a variety of water-soluble organic materials useful for the stimulation of plant growth are plentiful. That the material according to the present invention has a very high total carbon content is considered significant with respect to the effects produced by the material, since earthworm excrement, which has recently been recognized as having superior fertilizing effects, has a total carbon content of less than 40%.

EXPERIMENTAL EXAMPLE 2

A comparison of fertilizing effects was made between artificial fertile soil produced by the above-mentioned working examples and other fertilizers under the following conditions:
(1) Type of Plant
   Potato (Variety: Danshaku potato)
(2) Conditions of Soil in Planting Area
   Long-time pasture land
   Black-brown volcanic ash soil
(3) Planting Area
   Area per Unit: 8.75 m$^2$
(4) Number of Plants
   48 Plants/Unit
(5) Type of Fertilizer and Amount of Planting (translated into 10 ares)
   a. Accumulative Stable Manure Soil Unit (accumulative stable manure from completely ripened cattle excrement): 2,500 kg
   b. Compost Soil Unit (Dried Fowl Droppings plus Lye): 500 kg
   c. Present Invention's Fertile Soil Unit (Fertile soil obtained by the above working example): 500 kg
   d. Control Soil Unit (No fertilizer applied)
   Note: As a base fertilizer, a fertilizer having the following composition was applied to each unit:
      Nitrogen ingredient: 8.4 kg
      Phosphorus ingredient: 17.2 kg
      Potassium ingredient: 10.0 kg
(6) Method of Application
   Whole-surface spraying
The experiment produced the following crop yields:

TABLE

| Test Unit | Weight (g) | | | |
|---|---|---|---|---|
| | Within standard sizes | Smaller sizes | Minute sizes | Total |
| a | 263.0 | 61.0 | 43.8 | 367.8 |
|   | (94.0) | (104.6) | (100.7) | (96.4) |
| b | 283.3 | 60.2 | 48.0 | 391.5 |
|   | (101.3) | (103.3) | (110.3) | (102.6) |
| c | 340.4 | 62.7 | 27.3 | 430.3 |
|   | (121.7) | (107.5) | (62.8) | (112.8) |
| d | 279.8 | 58.3 | 43.5 | 381.6 |
|   | (100) | (100) | (100) | (100) |

Note:
Standard sizes 40 to 250 g
Smaller sizes 20 to 40 g

It was found, however, that the starch values in all the units were approximately identical to each other.

Periods of time required for the production of artificial fertile soil according to the method of the present invention, referring to the above-mentioned examples, are as follows:

Period required for the preparation of the first intermediate material: about 0.5 month Period for the second intermediate material: about 2 months Period for the third intermediate material: about 16 months Period for the fourth intermediate material: about 4 months Period for the final product: about 1.5 months It was found from the above results that the average period required for the preparation of the final product was nearly 2 years. Although this period seems long when compared with the time required for the production of artificial fertilizers, the fact that artificial fertile soil having characteristics comparable to those of natural fertile soil can be produced in a thousandth of the time required for the preparation of natural fertile soil should be greatly appreciated, especially since the artificial fertile soil according to the present invention has the ability to stimulate plant growth comparable to that of natural fertile soil, and further, since it has superior fertilizing effects to natural fertile soil. Since the number of beef cattle currently bred in Japan, for example, is around one million, the method in accordance with the present invention would permit the production of about 100,000 tons per annum of artificial fertile soil. The effect accomplished by the present invention could accordingly have a great significance in improving farmland soil.

As has been described in detail above, the method in accordance with the present invention has the following advantages:

(1) The method is capable of producing soil having significantly greater fertilizing effects than known artificial fertilizers with respect the causing no adverse effects on root growth (root poisoning) and able to accelerate the dense growth of strong crop plants to the same degree as natural fertile soil.

(2) It can produce such artificial fertile soil in an incomparable shorter period of time than is required for the preparation of natural fertile soil, and homogeneous soil can be obtained continuously over the whole year.

(3) Its production method is effective in fattening beef cattle and it can provide fowl and eggs of excellent quality without additional feeding, so that it can contribute greatly to the rationalization of livestock husbandry.

(4) In the production steps, the stirring and mixing is carried out mostly by the animals themselves and neither artificial heat nor machines are required for drying, so that the consumption of energy is small.

It is accordingly to be appreciated from the above advantages that the method in accordance with the present invention can greatly contribute to improvements in the productivity of the agricultural and livestock industries.

What is claimed is:

1. A method of preparing artificial fertile soil, comprising the steps of:

(a) raising four-footed livestock under densely populated conditions on a first litter comprising pulverized wood, allowing excrement produced by said livestock to mix with said first litter until the moisture content of said mixture of said first litter and livestock excrement is 60 to 90% by weight based on the weight of said mixture to thereby obtain a first intermediate material;

(b) mixing the first intermediate material with a crushed animal carcass material in an amount of from 5 to 20% by weight based on the weight of said first intermediate material and allowing the resulting product to undergo natural fermentation until said crushed animal carcass material is substantially decomposed to thereby form a second intermediate material;

(c) adding earthworms to the second intermediate material and maintaining the earthworms in said second intermediate material under breeding conditions for more than 9 months to thereby form a third intermediate material; and (d) raising poultry under densely populated conditions on a second litter containing said third intermediate material and allowing excrement produced by said poultry to mix with said second litter until the moisture content of said mixture of said second litter and said poultry excrement is 40 to 60% by weight based on the weight of said mixture.

2. The method of claim 1, further comprising subjecting the product obtained from step (d) to natural fermentation until the moisture content of said product is reduced to 20 to 40% by weight.

3. The method of claim 2, wherein the moisture content of said product is reduced to about 30% by weight.

4. The method of claim 1, wherein the four-footed livestock are selected from the group consisting of cattle, horses and swine.

5. The method of claim 4, wherein the four-footed livestock are cattle.

6. The method of claim 1, wherein the poultry are chickens.

7. The method of claim 1, wherein the number of earthworms is in a range from 1,000 to 3,000 times the number of livestock.

8. The method of claim 1, wherein the number of poultry is in a range from 4 to 6 times the number of livestock.

9. The method of claim 1, wherein the poultry are chickens and the four-footed livestock are cattle.

10. The method of claim 1, wherein the step of maintaining the earthworms in said second intermediate material is conducted for a time sufficient to obtain first and second generation earthworms.

11. The method of claim 1, wherein said four-footed livestock are cattle and the density of said cattle on said first litter is about one cow per 4 m².

12. The method of claim 1, wherein the pulverized wood is sawdust.

13. The method of claim 1, wherein the moisture content of said mixture of said first litter and livestock excrement is about 70% by weight based on the weight of said mixture.

14. The method of claim 1, wherein the amount of said crushed animal carcass material is 5 to 10% by weight based on the weight of said first intermediate material.

15. The method of claim 1, wherein said pulverized wood contains an insecticide, a fungicide or a mixture thereof.

16. The method of claim 1 further comprising pulverizing the product obtained from step (d).

17. The method of claim 1, further comprising pulverizing the product obtained from step (d) and subjecting said pulverized product to natural fermentation until the moisture content of said pulverized product is reduced to 20 to 40% by weight.

18. The product produced by the process of claim 1.

19. A method of preparing artificial fertile soil, comprising the steps of:
 (a) raising cattle at a density of about one cow per 4 m² on a first litter containing pulverized wood, allowing excrement produced by said cattle to mix with said first litter until the moisture content of said mixture of said first litter and cattle excrement is 60 to 90% by weight based on the weight of said mixture to thereby obtain a first intermediate material;
 (b) mixing the first intermediate material with a crushed animal carcass material in an amount of from 5 to 10% by weight based on the weight of said first intermediate material and allowing the resulting product to undergo natural fermentation until said crushed animal carcass material is substantially decomposed to thereby form a second intermediate material;
 (c) adding earthworms in an amount of 1,000 to 3,000 times the number of cattle to the second intermediate material and maintaining the earthworms in said second intermediate material under breeding conditions for more than 9 months to thereby obtain a third intermediate material; and
 (d) raising chickens in an amount of 4 to 6 times the number of cattle on a second litter containing said third intermediate material and allowing excrement produced by said chickens to mix with said second litter until the moisture content of said mixture of said second litter and said chicken excrement is 40 to 60% by weight based on the weight of said mixture.

20. The method of claim 19, further comprising subjecting the product obtained from step (d) to natural fermentation until the moisture content of said product is reduced to 20 to 40% by weight.

21. The method of claim 20, wherein the moisture content of said product is reduced to 30% by weight.

22. The method of claim 19, wherein the step of maintaining the earthworms in said second intermediate material is conducted for a time sufficient to obtain first and second generation earthworms.

23. The method of claim 19, wherein the pulverized wood is sawdust.

24. The method of claim 19, wherein the moisture content of said mixture of said first litter and cattle excrement is about 70% by weight based on the weight of said mixture.

25. The method of claim 19, wherein the amount of said crushed animal carcass material is 5 to 10% by weight based on the weight of said first intermediate material.

26. The method of claim 19, wherein said pulverized wood contains an insecticide, a fungicide or a mixture thereof.

27. The method of claim 19, further comprising pulverizing the product obtained from step (d).

28. The method of claim 19, further comprising pulverizing the product obtained from step (d) and subjecting said pulverized product to natural fermentation until the moisture content of said pulverized product is reduced to 20 to 40% by weight.

29. The product produced by the process of claim 19.

* * * * *